June 23, 1931.  H. E. BURTON  1,811,172
BRAKE EQUALIZER
Filed Aug. 6, 1929   2 Sheets-Sheet 1
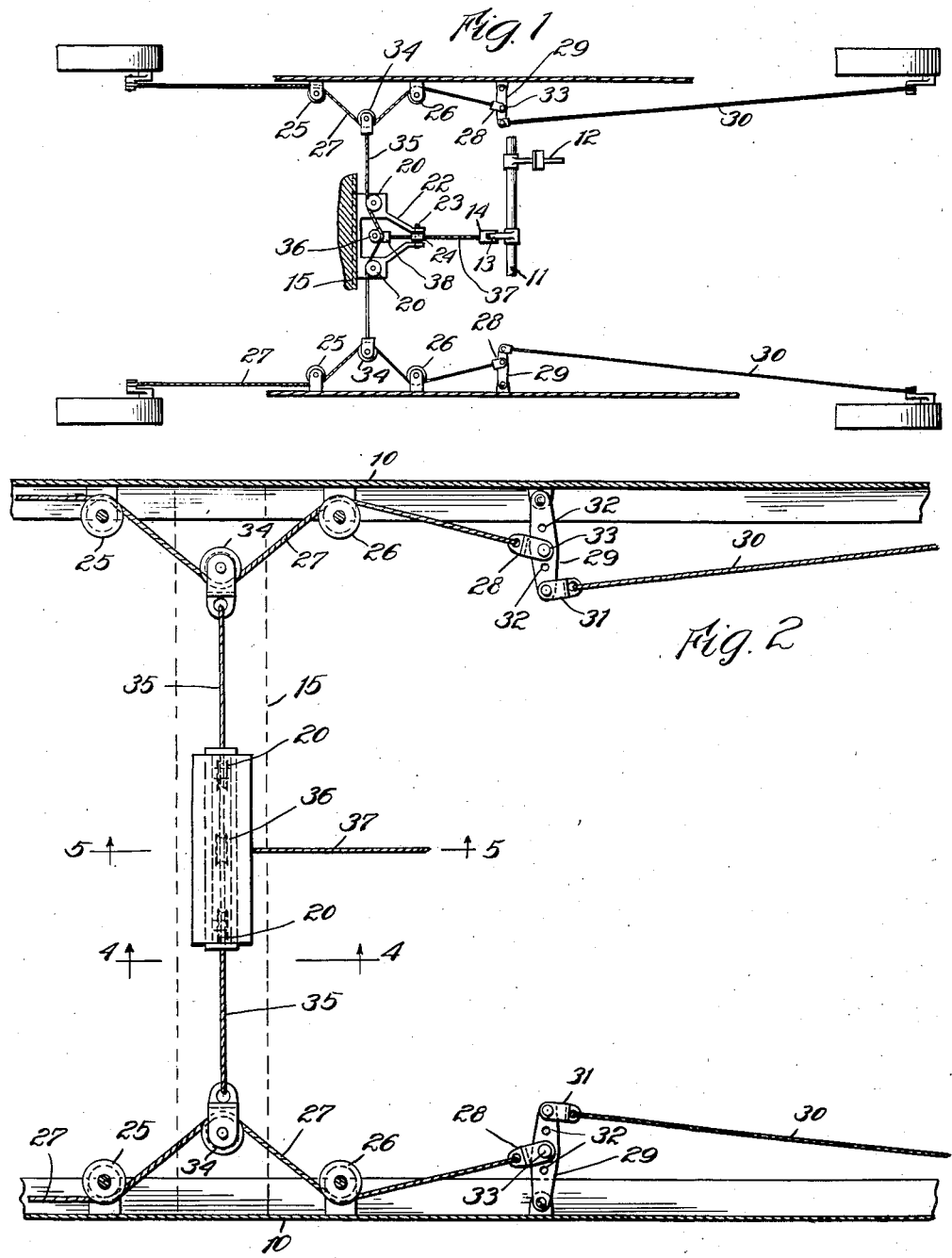

June 23, 1931. H. E. BURTON 1,811,172
BRAKE EQUALIZER
Filed Aug. 6, 1929 2 Sheets-Sheet 2
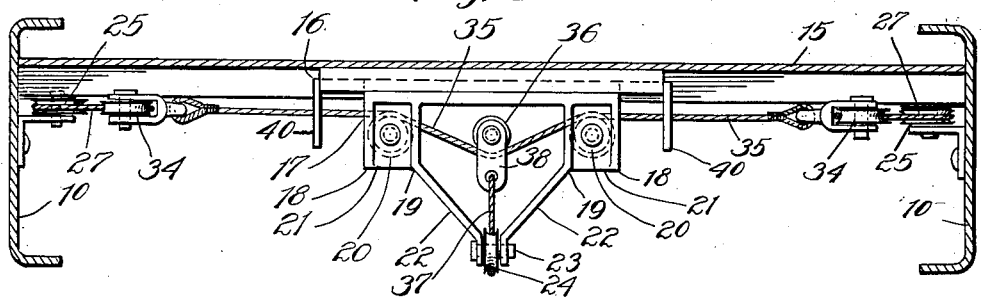
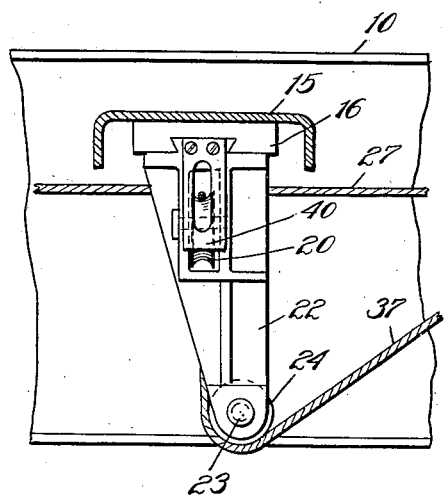
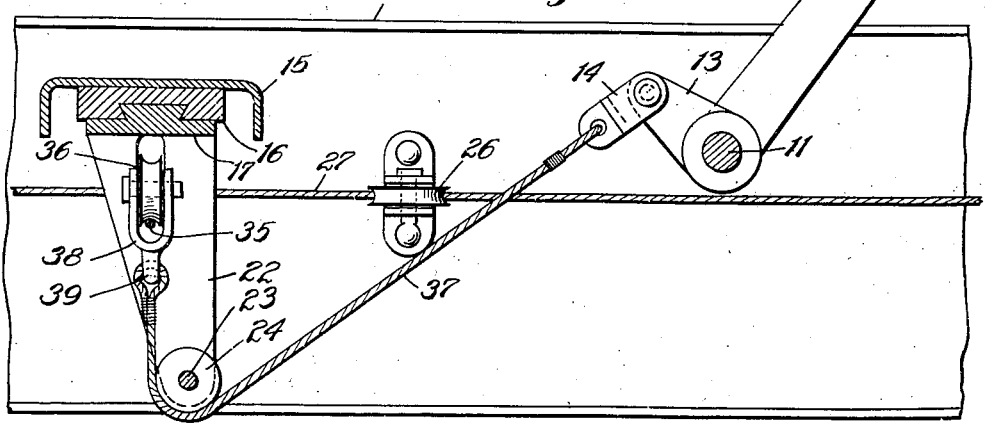
Inventor
Harry E. Burton
by Cheever, Cox & Moore
Attys Patented June 23, 1931

1,811,172

UNITED STATES PATENT OFFICE

HARRY E. BURTON, OF CHICAGO, ILLINOIS

BRAKE EQUALIZER

Application filed August 6, 1929. Serial No. 383,832.

This invention relates to brakes in general and particularly to four-wheel brakes for automobiles. More specifically, the invention relates to means for equalizing the brake pressure on four-wheel automobile brakes.

The object of the invention is to provide an equalizer, whereby the exact braking pressure may be equally exerted on all four brakes.

Another object is to provide a device for four-wheel brakes which is self-equalizing.

A further object is to provide a cable attachment for operating brakes on automobiles, which is provided with means for equally distributing the brake pressure on all four wheels.

A still further object is to provide a brake mechanism which is provided with self-equalizing means for obtaining the proper and equal braking pressure to be applied on the brake drums of all four wheels.

Still another object is to provide a cable equalizing unit for automobile brakes, whereby the operation of the brake pedal will cause equalized pressure to be distributed to the various brakes. Another object is to provide lever means operatively connected to a brake lever or arm whereby pressure exerted on the brake pedal will be transmitted through the lever and to the brake lever or arm.

Numerous other objects and advantages will appear throughout the progress of the specification.

The invention comprises in general a pair of cables which travel over pulleys and are operatively connected to the two brakes on each side of the automobile. A slidable member is provided with a cable, which operates over pulleys. This cable has pulleys provided at its ends and engages the cables on the side of the automobile between the pulley over which the side cables operate. A cable leading from the brake pedal is operatively connected to the cable on the slidable member, whereby any pressure exerted on the brake pedal is equally distributed to the side cables which are connected to the brakes. A lever may be interposed between one of the pulleys on the side and the front brakes to reduce the braking pressure on the front wheels. This reduced braking pressure on the front wheels is customary as it is desirable that the brakes on the front wheels have less braking action than those on the rear wheels.

The accompanying drawings illustrate a selected embodiment of the invention and the views therein are as follows:

Fig. 1 is a diagrammatic or schematic view of the brake equalizer assembly.

Fig. 2 is a detail top plan view of the device applied to the side bars of an automobile frame.

Fig. 3 is a detail transverse sectional view thereof.

Fig. 4 is a detail sectional view on the line 4—4 of Fig. 2.

Fig. 5 is a detail sectional view on the line 5—5 of Fig. 2.

Referring to the drawings, 10, 10 designates the usual side bars of an automobile frame having the usual cross shaft 11, to which the usual brake pedal 12 is rigidly attached. An arm or lever 13 is rigidly connected to the shaft 12 and a link 14 is pivotally connected to the lever 13.

A cross member 15 is connected to the side bars and has a track or guide 16 rigidly attached thereto, in which a block or member 17 is slidably mounted. A pair of downwardly extending outside arms 18 and a pair of downwardly extending inside arms 19 are rigidly connected to the member 17, and pulleys 20 are revolubly mounted on plates or webs 21 between each of the arms 18 and 19. Downwardly extending bracket members 22, which are preferably made integral with the arms 19, have a shaft 23 supported thereby, upon which a pulley 24 is revolubly mounted.

Oppositely alined pulleys 25 and 26 are mounted on each of the side bars 10, over which side cables 27 pass. The rear ends of the cables 27 are operatively connected to a rear brake operating lever, and the forward end of these cables carry links 28, which are pivotally connected to levers 29 pivoted to the side bars 10. A pair of forward cables 30 have their forward ends operatively connected to the levers which operate the front brakes, and their rear ends connected to links 31 which are pivoted to the levers 29.

Each lever 29 is provided with a plurality of holes or apertures 32, through which a pin 33 for the links 28 extends to obtain various leverages for increasing or diminishing the braking pressure on the front brakes. As shown in Fig. 2 the lever 29 is pivotally connected to the automobile frame, and the cables 27 and 30 are pivotally connected to the lever 29. However, instead of using the cables 27 and 30, rods may be used in place thereof.

A pair of pulleys 34 have operative engagement with the cables 27 and are operatively connected to a cable 35 which passes under and supports a pulley wheel 36 arranged between the two pulleys 20. A cable 37 has its forward end connected to the link 14 and passes over the pulley 24, and has its other end connected to a yoke 38 upon which the pulley wheel 36 is revolubly mounted.

A stop 40 may be arranged on each end of the track 16 to limit the sliding movement of the member or block 17.

Pressure on the brake pedal creates a pull on the cable 37 which is transmitted to the pulley 36 and causes the cable 35 to pull equally on the side cables 27 inwardly. This equal pull on the side cables is transmitted equally to the rear brakes and to the levers 29 which reduces the pull on the front wheel brakes. The holes in these levers are spaced to obtain various pressures on the front wheel brakes. It is usual, however, that the front wheel brakes have substantially about sixty per cent of the braking power of the rear wheel brakes. The holes in the levers are made so that this ratio can be increased or decreased, as desired or required. It can thus be readily seen that pressure on the foot pedal will equally distribute the pressure exerted thereon to the rear brakes and to the levers 29, the levers 29 reducing the pressure on the front wheel brakes.

The sliding engagement of the member or block 17 in the track or guide 16 overcomes the friction of the various bends in the cable as it passes over the pulleys causing the member or block 17 to shift from one side to the other. This sliding engagement may also be of assistance in creating equalization of pressure if thicknesses of the braking linings are different.

The invention provides a brake operating device which is self-equalizing, as a pull on the main operating cable 37 will be equally distributed to the rear brakes and to the levers. It is to be understood, of course, that rods may be substituted for some of the cables shown and the invention is not to be limited in this respect.

Changes may be made in the form, construction and arrangement of the parts without departing from the spirit of the invention or sacrificing any of its advantages, and the right is hereby reserved to make all such changes as fairly fall within the scope of the following claims.

I claim:

1. In a vehicle having four-wheel brakes, a cable operatively connecting a front and rear brake on each side of said vehicle, pulleys engageable with said cables, a cross cable connecting said pulleys, a slidable element, pulleys on said slidable element and supporting said cross cable, a central pulley supported by said cross cable, and means operatively connected to said central pulley for equally distributing any pressure which may be transmitted to said last named means.

2. In a vehicle having four-wheel brakes, a cable operatively connecting a front and rear brake on each side of said vehicle, pulleys engageable with said cables, a cross cable connecting said pulleys, a slidable element, pulleys on said slidable element and supporting said cross cable, a central pulley supported by said cross cable, another pulley revolubly mounted on said slidable element, a brake pedal, a cable operatively connected to said brake pedal and to said central pulley and passing over said last named pulley, whereby pressure on said brake pedal will be equally distributed to said first named pair of cables.

3. In a vehicle having four-wheel brakes, a cable operatively connecting a front and rear brake on each side of said vehicle, pulleys engageable with said cables, a cross cable connecting said pulleys, a slidable element, pulleys on said slidable element and supporting said cross cable, a central pulley supported by said cross cable, another pulley revolubly mounted on said slidable element, a brake pedal, a cable operatively connected to said brake pedal and to said central pulley and passing over said last named pulley, whereby pressure on said brake pedal will be equally distributed to said first named pair of cables.

4. In a vehicle having four-wheel brakes, a pair of cables connected to a rear brake on each side of the vehicle, levers pivoted to a part of said vehicle and connected to the other ends of said cables, front cables connected to said levers and to a front brake on each side of said vehicle, pulleys engageable with said first named pair of cables, a cross cable connecting said pulleys, a slidable element, a pair of pulleys on said slidable element arranged between said pair of pulleys and supporting said cross cable, a central pulley arranged between said pair of pulleys and supported by said cross cable, a lower pulley mounted on said slidable element, a brake pedal, a cable connecting said brake pedal and said central pulley and passing over said lower pulley, whereby pressure on said pedal will be equally distributed to the rear brakes and to the levers, said levers reducing the pressure on said front brake.

5. In a vehicle having four-wheel brakes, a cable operatively connecting a front and rear brake on each side of said vehicle, pulleys engageable with said cables, a cross cable connecting said pulleys, an equalizer element, pulleys on said element and supported by said cross cable, a central pulley supported by said cross cable, means operatively connected to said central pulley for distributing pressure applied on said last named means to said cross cable, a lever interposed in each cable connecting a front and rear brake on each side of said vehicle and pivotally connected to said vehicle, and means for adjustably connecting each front to rear cable to its respective lever.

6. In an automobile having front to rear longitudinal side bars, wheels for said automobile, a brake for each wheel, a lever or arm pivotally connected to each of said side bars, front to rear members connected to said brakes on each side and directly to an arm or lever on the same side, and brake operating mechanism for operating said front to rear members.

In witness whereof, I have hereunto subscribed my name.

HARRY E. BURTON.